(12) United States Patent
Brown

(10) Patent No.: US 8,488,224 B2
(45) Date of Patent: Jul. 16, 2013

(54) TUNED SUPPORT STRUCTURES FOR ELECTROSTATIC COMB DRIVE SCANNER

(75) Inventor: Dean R. Brown, Lynnwood, WA (US)

(73) Assignee: Microvision, Inc., Redmond, WA (US)

( * ) Notice: Subject to any disclaimer, the term of this patent is extended or adjusted under 35 U.S.C. 154(b) by 365 days.

(21) Appl. No.: 12/879,297

(22) Filed: Sep. 10, 2010

(65) Prior Publication Data

US 2012/0062971 A1 Mar. 15, 2012

(51) Int. Cl.
*G02B 26/10* (2006.01)
(52) U.S. Cl.
USPC .............. 359/199.2; 359/224.1; 359/904
(58) Field of Classification Search
USPC .......... 359/198.1–199.4, 200.6–200.8, 202.1, 359/221.2, 223.1–225.1, 226.2, 904, 290–295, 359/838, 846, 871, 872; 250/204, 559.06, 250/559.29, 230, 234; 347/255–260; 353/39, 353/98–99; 385/15–18, 22; 398/12, 19, 45
See application file for complete search history.

(56) References Cited

U.S. PATENT DOCUMENTS 7,872,394 B1 * 1/2011 Gritters et al. ............... 310/309

* cited by examiner

*Primary Examiner* — Jennifer L. Doak
(74) *Attorney, Agent, or Firm* — Kevin D. Wills

(57) ABSTRACT

Briefly, in accordance with one or more embodiments, an electric comb drive scanner comprises a scanning body comprising a mirror supported by one or more flexures along a first axis and one or more support structures coupled to the one or more flexures. One or more drive combs are disposed on the one or more support structures, wherein the drive combs cause the mirror to rotate about the first axis in response to a drive signal applied to the drive combs. The one or more support structures are tuned to reduce non-uniformity of warping of the support structures to reduce variation in disengagement of the drive combs along a length of the drive combs.

9 Claims, 8 Drawing Sheets

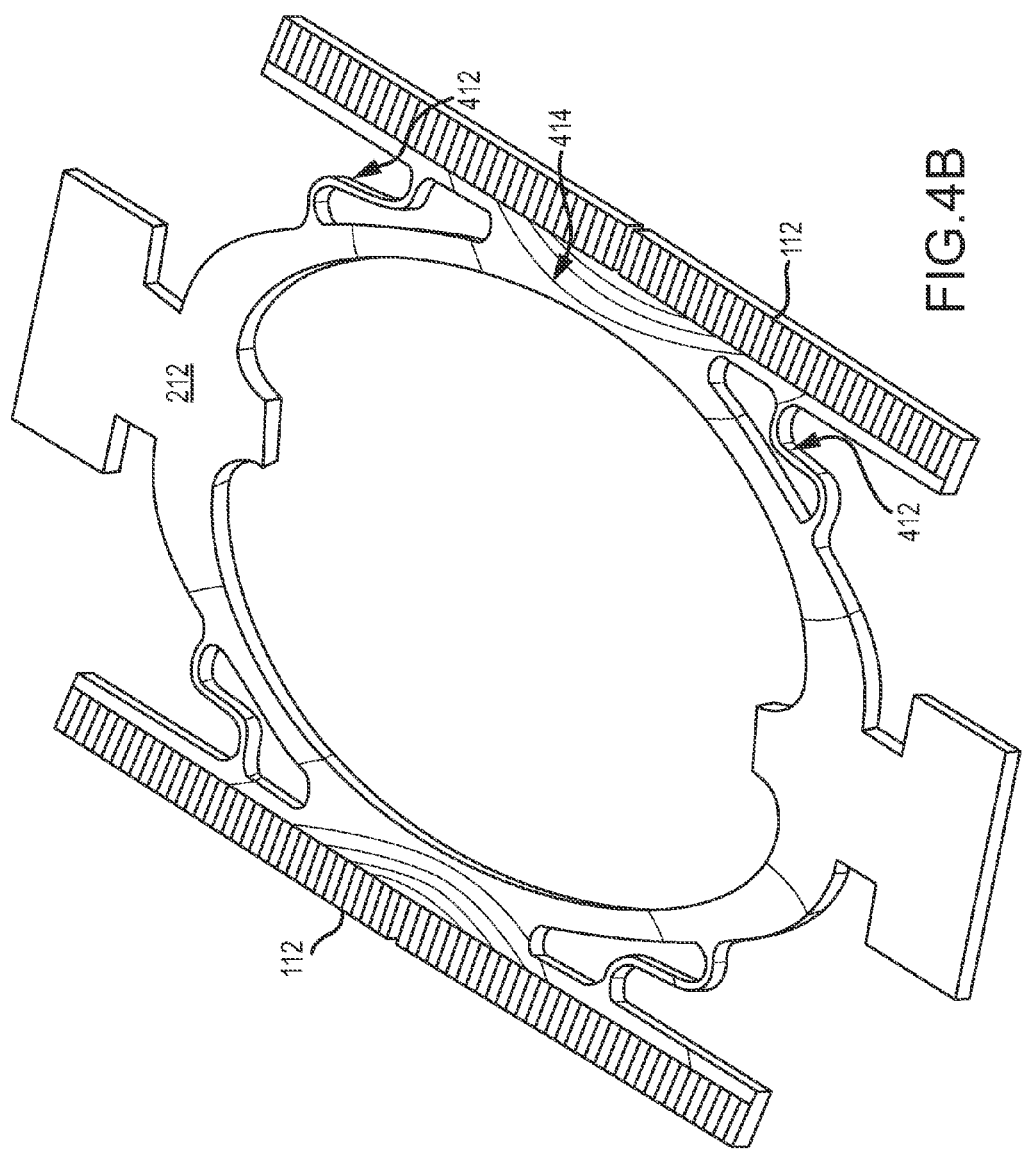

TUNED SUPPORT STRUCTURES FOR ELECTROSTATIC COMB DRIVE SCANNER

BACKGROUND

Many mircroelectromechanical system (MEMS) scanners are actuated with electrically driven comb drive structures. One problem that comb drive scanners may suffer is that the inertial and stiffness loads cause deformation of the combs resulting in a variable comb disengagement along the length of the comb. The variation in comb disengagement results in a reduced efficiency of the comb drive. Stiffening of the comb structure to prevent bending is a common approach to address this problem. However, this results in additional inertial mass of the moving parts with an attendant increase in the needed drive power causing difficulty in controlling frequencies of ancillary vibration modes. Another approach is to increase the amount of comb disengagement so that all combs will achieve a full amount of disengagement in order to minimize the effects of variable comb disengagement. However, this approach comes at a cost of increased drag and reduced drive efficiency.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

FIGS. 4A and 4B are diagrams of a scanning platform of an electric comb drive scanner at an extreme angle having tuned stiffness comb support structures to mitigate warping of the comb regions of the scanning platform in accordance with one or more embodiments;

Figure 1:
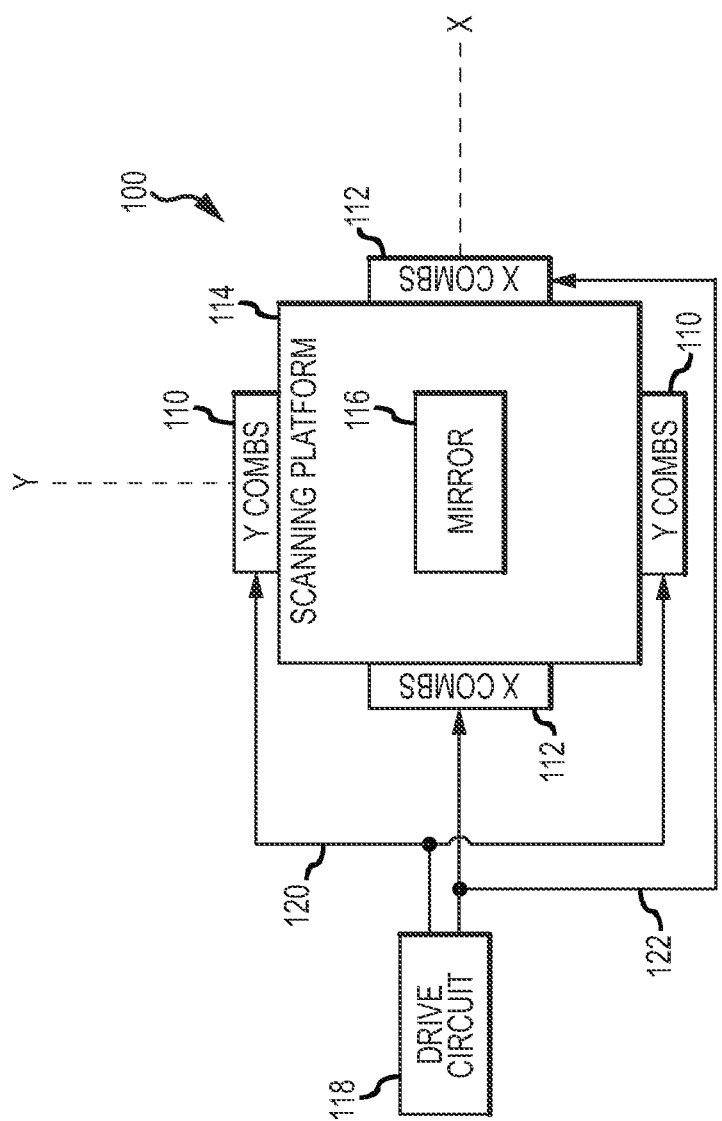
FIG. 1 is a diagram of an electric comb drive scanner in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an electric comb drive scanner in accordance with one or more embodiments will be discussed. As shown schematically in FIG. 1, scanner 100 may comprise a scanning platform 114 having a mirror 116 or similar reflective surface or other structure disposed thereon. Scanning platform 114 may have one or more combs 110 (Y COMBS) that may be electrically driven to cause mirror 116 to rotate about a first axis, in this example the X-axis, so that a beam impinging on mirror 116 may be redirected in the Y direction along the Y-axis according to the movement of mirror 116. Likewise, scanning platform 114 may have one or more combs 112 (X COMBS) that may be electrically driven to cause mirror 116 to rotate about a second axis, in this example the Y-axis, so that a beam impinging on mirror 116 may be redirected in the X direction along the X-axis according to movement of mirror 116. A drive circuit 118 may provide the proper drive voltages via drive lines 120 to combs 110 and drive lines 122 to combs 112 to cause the desired actuation of the combs to result in the desired movement of mirror 116. In some embodiments, scanning platform 114 has one set of combs to provide one-dimensional scanning of mirror 116 as a uniaxial scanner, and in other embodiments, scanning platform 114 may have two sets of combs as shown to provide two-dimensional scanning of mirror 116 as a biaxial scanner, although the scope of the claimed subject matter is not limited in this respect. In order to mitigate distortion and/or warping of the support structures of scanning platform 114 on which combs 110 and combs 112 are disposed, the support structures may be tuned to a selected stiffness so that the combs do not become overly disengaged from the other combs in a set in a non-uniform manner. Such an arrangement is shown in and described with respect to FIG. 4A and FIG. 4B, below. In one or more embodiments, scanning platform 114 may be fabricated from silicon or similar material, and example of which is shown in and described with respect to FIG. 2, below.

Figure 2:
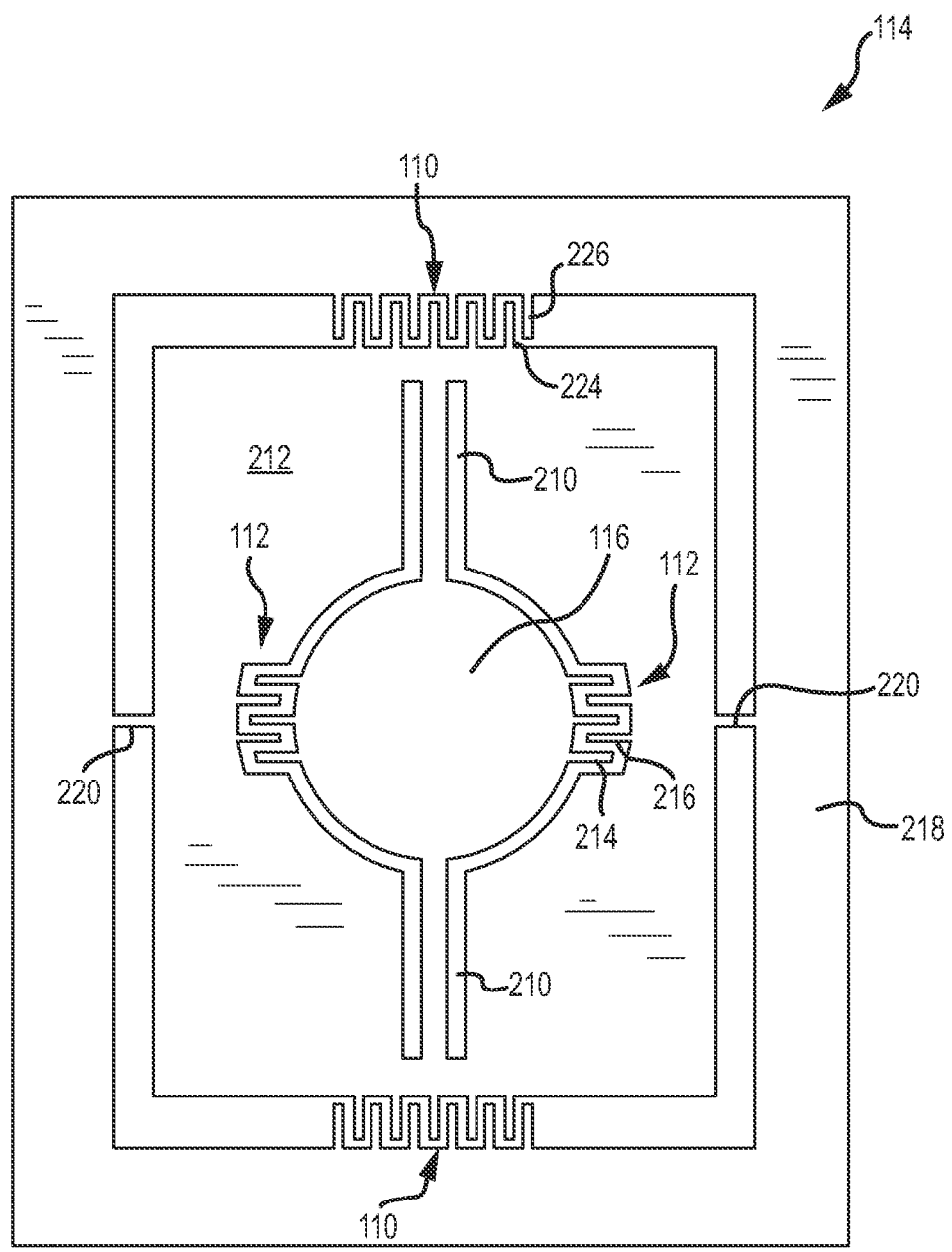
FIG. 2 is a diagram of an example scanning platform of an electric comb drive scanner in accordance with one or more embodiments.

Referring now to FIG. 2, a diagram of an example scanning platform of an electric comb drive scanner in accordance with one or more embodiments will be discussed. As shown in FIG. 2, the example electric comb drive scanning platform 114 comprises scanning mirror 116 suspended generally along a Y-axis by flexures 210 coupled to scanning body 212. Scanning mirror 116 and/or scanning body 212 include interdigitated fast scan comb fingers 214 and 216, respectively, which together comprise combs 112 on one or both sides of scanning mirror. Comb fingers 214 and 216 may be metalized or otherwise electrically conductive such that the fingers 214 and 216 may be charged with an appropriate drive signal to cause scanning mirror 116 to rotate about the Y-axis defined by flexures 210 via torsional deformation of the flexures so that a beam reflected off of mirror 116 will may be scanned across the X-axis. In one or more embodiments, scanning platform 114 comprises silicon or the like such that scanning platform 114 may comprise a mircoelectromechanical system (MEMS) device using silicon fabrication technologies, although the scope of the claimed subject matter is not limited in this respect. Thus, in one or more embodiments, scanning mirror 116 may be designed to have a particular mass which in conjunction with the torsional characteristics of the material from which flexures 210 are formed may result in a natural resonance characteristic of the rotational movement of scanning mirror 116 about the Y-axis defined by flexures 210. In one or more embodiments, the drive signal applied to comb fingers 214 and 216 may drive scanning mirror 116 at or near its designed natural resonant frequency, and in one or more alternative embodiments, the drive signal may drive scanning mirror 116 non-resonantly at a frequency other than the natural resonant frequency of scanning mirror 116, however the scope of the claimed subject matter is not limited in this respect.

In one or more embodiments, scanning body 212 may in turn be suspended within fixed frame 218, which in general may comprise a fixed body or other support body, by flexures 220 generally disposed along an X-axis. Likewise, scanning body 212 and fixed frame 218 include interdigitated slow scan comb fingers 224 and 226, respectively, which may also be metalized and driven with another drive signal to cause the entirety of scanning body 212 to oscillate about the X-axis defined by flexures 220 via torsional deformation of flexures 220. Thus, in one or more embodiments, a beam of light such as a laser beam may be directed onto scanning mirror 116 and reflected off of scanning mirror 116 as an output beam in a raster scan or similar pattern. In such an arrangement, which is shown in and described with respect to FIG. 5 below, fast scan comb fingers 214 and 216 may be driven with a horizontal drive signal received from drive circuit 118 to create a fast scan in a horizontal direction, and slow scan comb fingers 224 and 226, which together comprise combs 110 one or more both sides of frame 218, may be driven with a vertical drive signal received from drive circuit 118 to create a slow scan in a vertical direction to generate an overall two-dimensional raster scan, although the scope of the claimed subject matter is not limited in these respects. One potential problem with combs 110 and/or combs 112 is that during operation of scanning platform 114, at extreme angles of deflection, scanning body 212 and/or frame may undergo distortion or warping in a non-uniform manner such that some portion of the combs 214 may become overly disengaged from a corresponding portion of combs 216, or likewise a portion of combs 224 may become overly disengaged from a corresponding portion of combs 226. As a result of the warping, the disengagement of the combs may be non-uniform which reduces the efficiency of operation of the combs. To accommodate such a situation, the support structure or structures of scanning body 212 and/or frame 218 on which the combs are disposed may be tuned to a desired stiffness to reduce and/or mitigate warping of the support structures so that the combs may be more uniformly disengaged. An example of warping of the support structures at an extreme angle of actuation is shown in and described with respect to FIG. 3A and FIG. 3B, below, and an example of tuned support structures to address the warping and non-uniform comb disengagement is subsequently shown in and described with respect to FIGS. 4A and 4B, below.

Figure 3A:
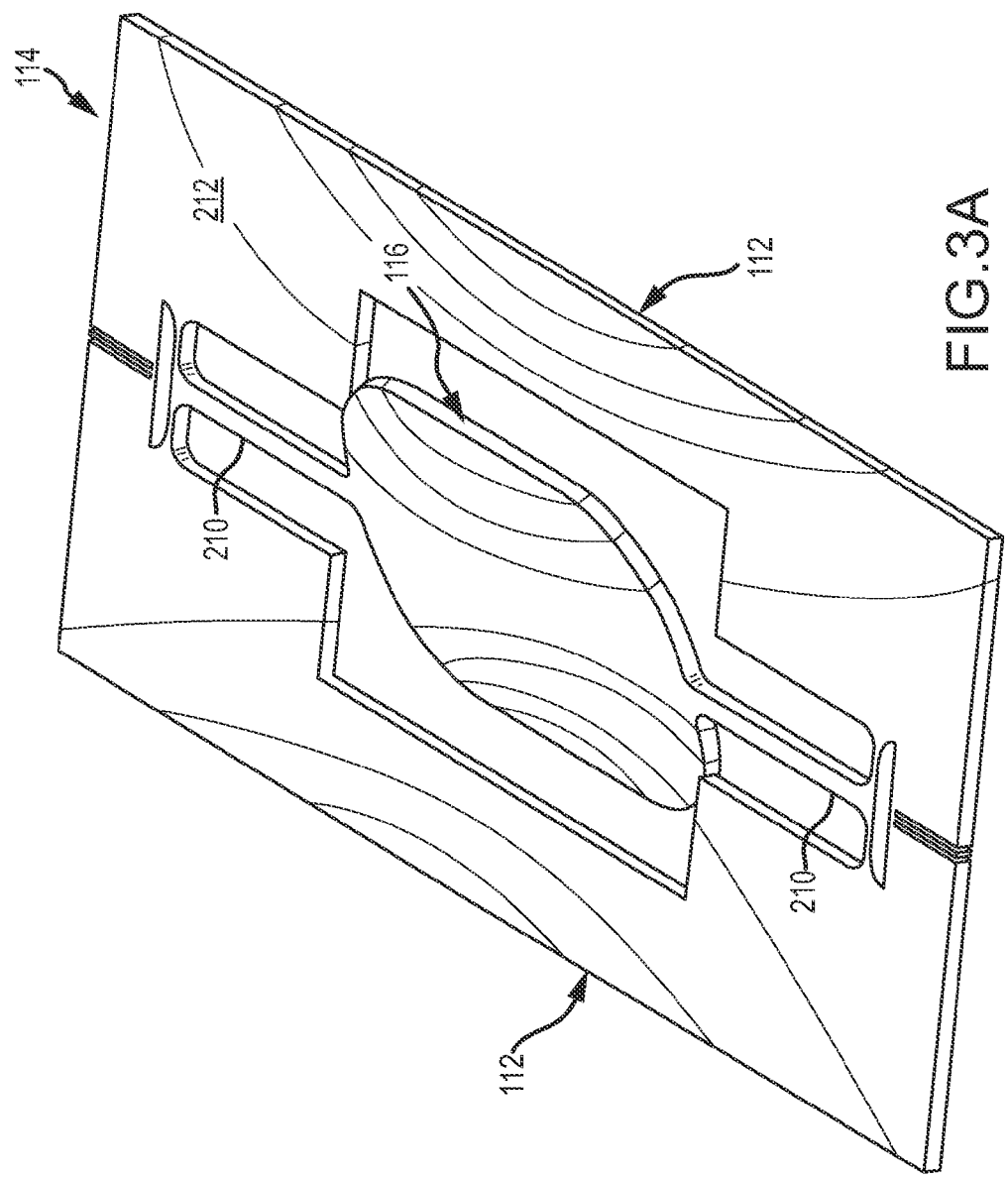
FIGS. 3A and 3B are a diagrams of an example scanning platform of an electric comb drive scanner at an extreme scan angle in accordance with one or more embodiments illustrating warping of the comb regions of the scanning platform.
Figure 3B:
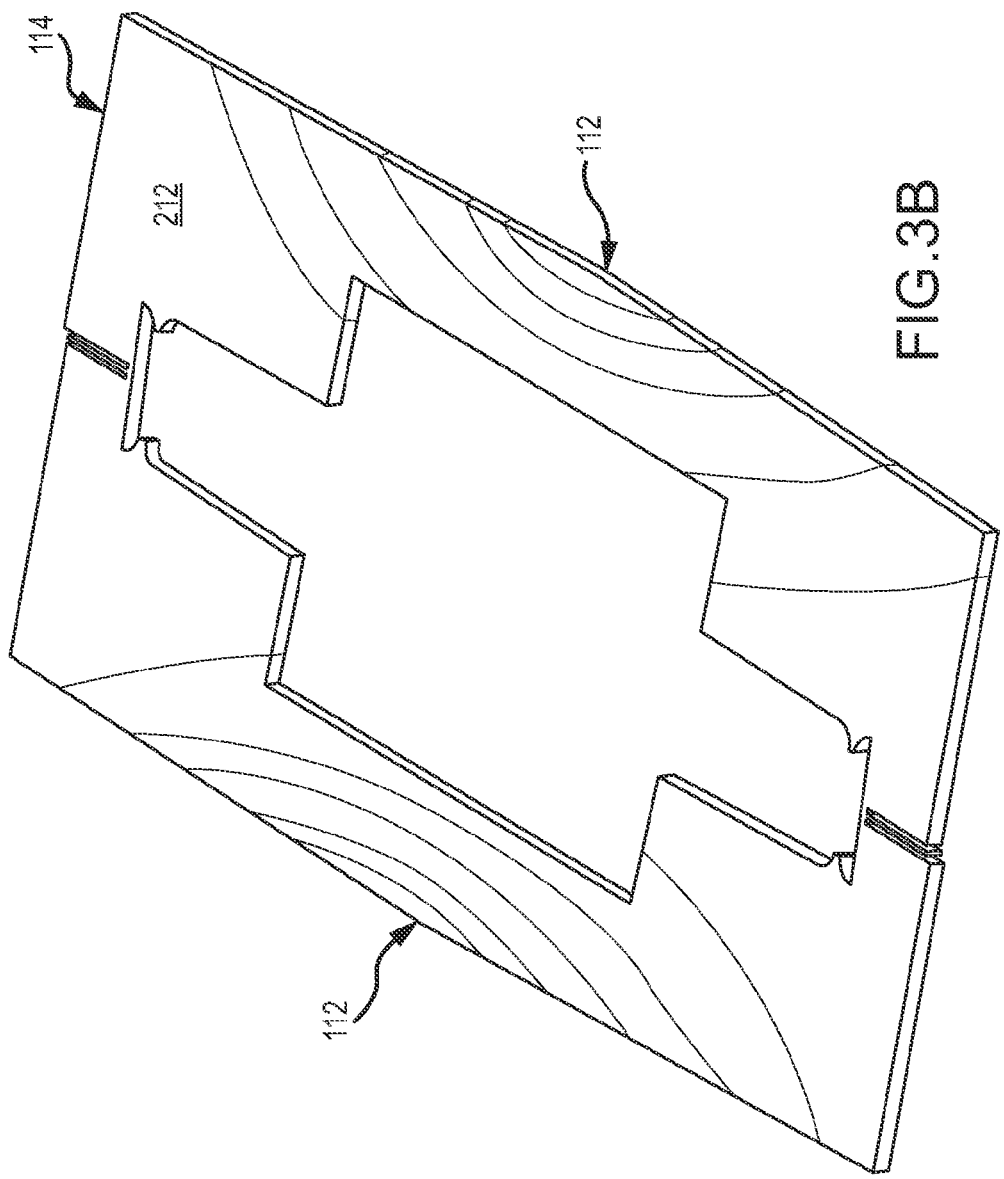

Referring now to FIGS. 3A and 3B, diagrams of an example scanning platform of an electric comb drive scanner at an extreme scan angle in accordance with one or more embodiments illustrating warping of the comb regions of the scanning platform will be discussed. FIG. 3A shows the scanning mirror 116 at an extreme scan angle with respect to a plane of scanning platform 114. The drive combs 112 are disposed on opposite sides of scanning body 212 to drive mirror 116 and cause mirror 116 to rotate via a twist along flexures 210. FIG. 3A shows the resulting warping in scanning body 212 at the location of combs 112 when the mirror 116 is rotated to an extreme angle. Note that the mirror 116 is not shown in FIG. 3B for purposes of illustration. Since the combs 112 are planar devices disposed on the planar surface of scanning platform 114, extreme actuation of mirror 116 causes scanning body 212 to warp out of the plane of scanning platform 114, thereby causing the combs 112 to be warped out of plane. In the example shown, there is a greater amount of warping of scanning plate 212 near the middle than at the outer ends. As a result, comb fingers 214 and 216 disposed at the middle of scanning plate 212 will be more disengaged than comb fingers 214 and 216 disposed at the ends of the comb structure. Other types of non-planar warping my likewise occur, for example where there is more warping at one portion of combs than at another portion of the combs resulting in non-uniform comb disengagement. As a result, the operation of combs 112 will be less efficient where there is a greater amount of non-uniform disengagement which will otherwise require more power to be applied to the combs to provide a desired motion of the mirror 116. To mitigate this effect and to increase the efficiency of operation of the combs 112, the support structures of scanning body 212 may be tuned such that the amount of any warping is more uniform across the length of the combs to result in more uniform disengagement of the combs. An example of such tuned support structures is shown in and described with respect to FIG. 4A and FIG. 4B, below.

Figure 4A:
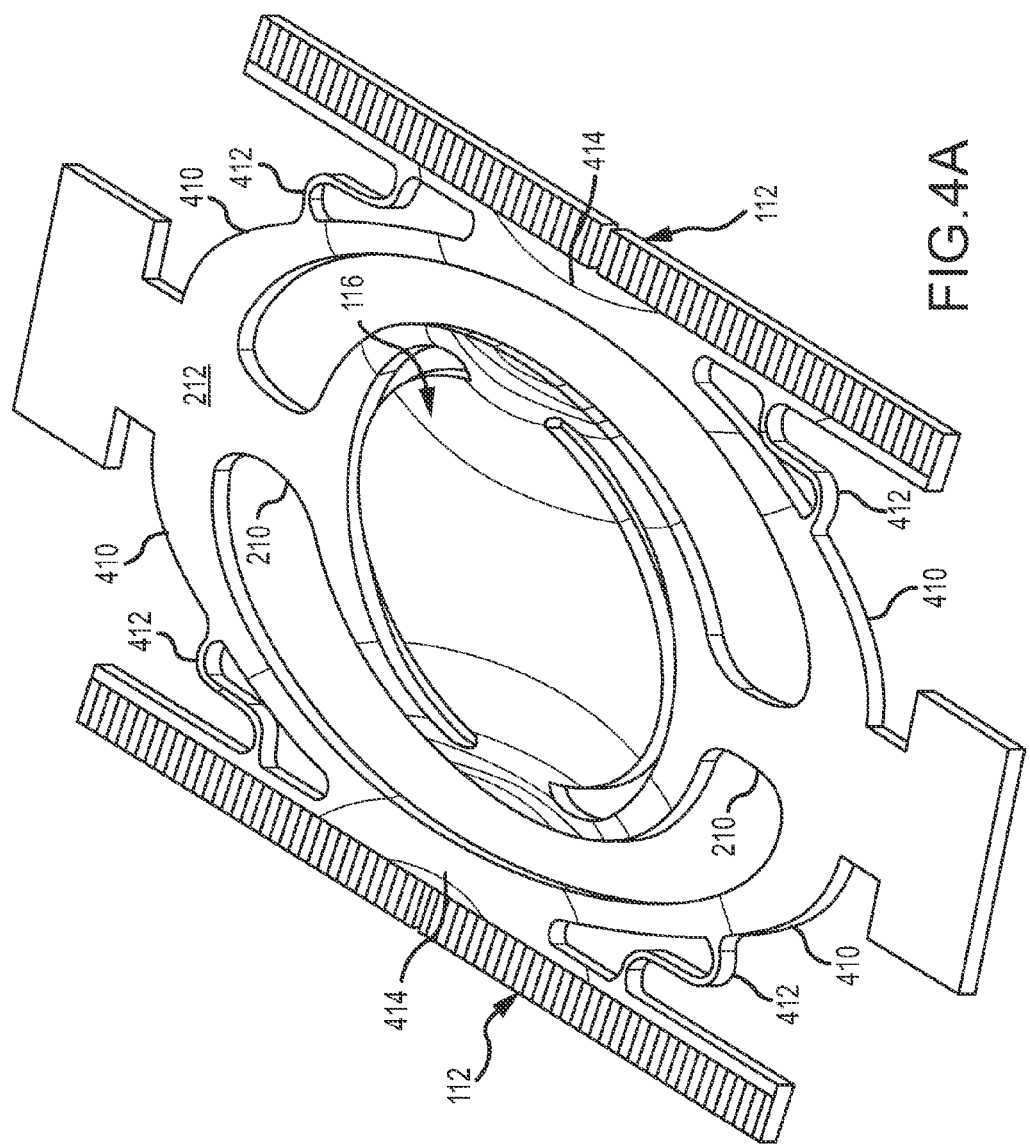

Referring now to FIGS. 4A and 4B, diagrams of a scanning platform of an electric comb drive scanner at an extreme angle having tuned stiffness comb support structures to mitigate warping of the comb regions of the scanning platform in accordance with one or more embodiments will be discussed. In the example shown in FIG. 4A, scanning body 212 may have tuned support structures such as support arms 410 and support structures 412 which, together with the support structures 414 on which the combs 112 are disposed may tune scanning body 212 such that non-uniformity of warping is reduced or sufficiently eliminated. Scanning body 212 may have support arms 410 formed thereon to couple with flexures 210 to support mirror 116. Support arms 410 couple with support structures 414 on which combs 112 may be disposed. In the example shown in FIG. 4A, only comb fingers 214 of combs 112 are shown, and the corresponding mating comb fingers 216 are not shown. Also note that in contrast to the example shown in FIG. 2, combs 112 are disposed on scanning body 212 rather than on mirror 116 wherein mirror 116 is indirectly driven via movement of scanning body via actuation of combs 112 rather than a direct drive arrangement as shown in FIG. 2. Furthermore, support structures 412 may be provided between support arms 410 and an outer portion of support structure 414. In the embodiment shown, support structures 412 are generally S-shaped. In one or more alternative embodiments, support structures 412 may comprise various other shapes such as arcs or other curve shapes, linear shapes such as L-shapes, angles, or lines, and so on, and the scope of the claimed subject matter is not limited in these respects.

FIG. 4B illustrates how the tuning of scanning body 212 via selected support arms 410, support structures 412 and/or support structures 414 may result in a more uniform warping along the length of support structures 414 on which combs 112 are disposed. As a result, the disengagement of the comb fingers is likewise more uniform, thereby maintaining the efficiency of combs 112. It should be noted that mirror 116 is not shown in FIG. 4B for purposes of illustration. Such tuning of the support structures may be accomplished via dynamic analysis, simulation, and or trial and error, until a desired amount of uniformity in the warping of the support structures is reached. In embodiments wherein scanning body 114 is fabricated from silicon or a similar material, the amount of non-uniformity of warping may be reduced to be on the order of any warping resulting from fabrication process variation, although the scope of the claimed subject matter is not limited in this respect. In general, by providing a tuned stiffness support structure for combs 112, for example via support arms 410, support structures 412, and/or support structures 414, the linear array of comb fingers of combs 110 and/or 112 may be maintained at a uniform, or sufficiently uniform, displacement at extreme scan angles of mirror 116. Tuning may be accomplished via variation of the shape of support structures 412 and the location of attachment points of support structures 412 to support arms 410 and/or support structures 414. Furthermore, the length of support structures 414 may be selected to provide a desired tuning. Tuning may be accomplished, for example, when mirror 116 is capable of being deflected at a desired maximum scan angle at a desired maximum drive voltage. As will be discussed below, scanning platform 114 having tuned support structures for a comb drive scanner 100 may be incorporated into a scanned beam display wherein a light beam may be reflected off of mirror 116 in a desired manner to create a projected image. Similarly, scanning platform 114 having tuned support structures for a comb drive scanner 100 may be incorporated into other types of scanning devices such as other types of scanning displays, sensors, scanning cameras, bar code readers, and so on, and the scope of the claimed subject matter is not limited in these respects.

Figure 5:
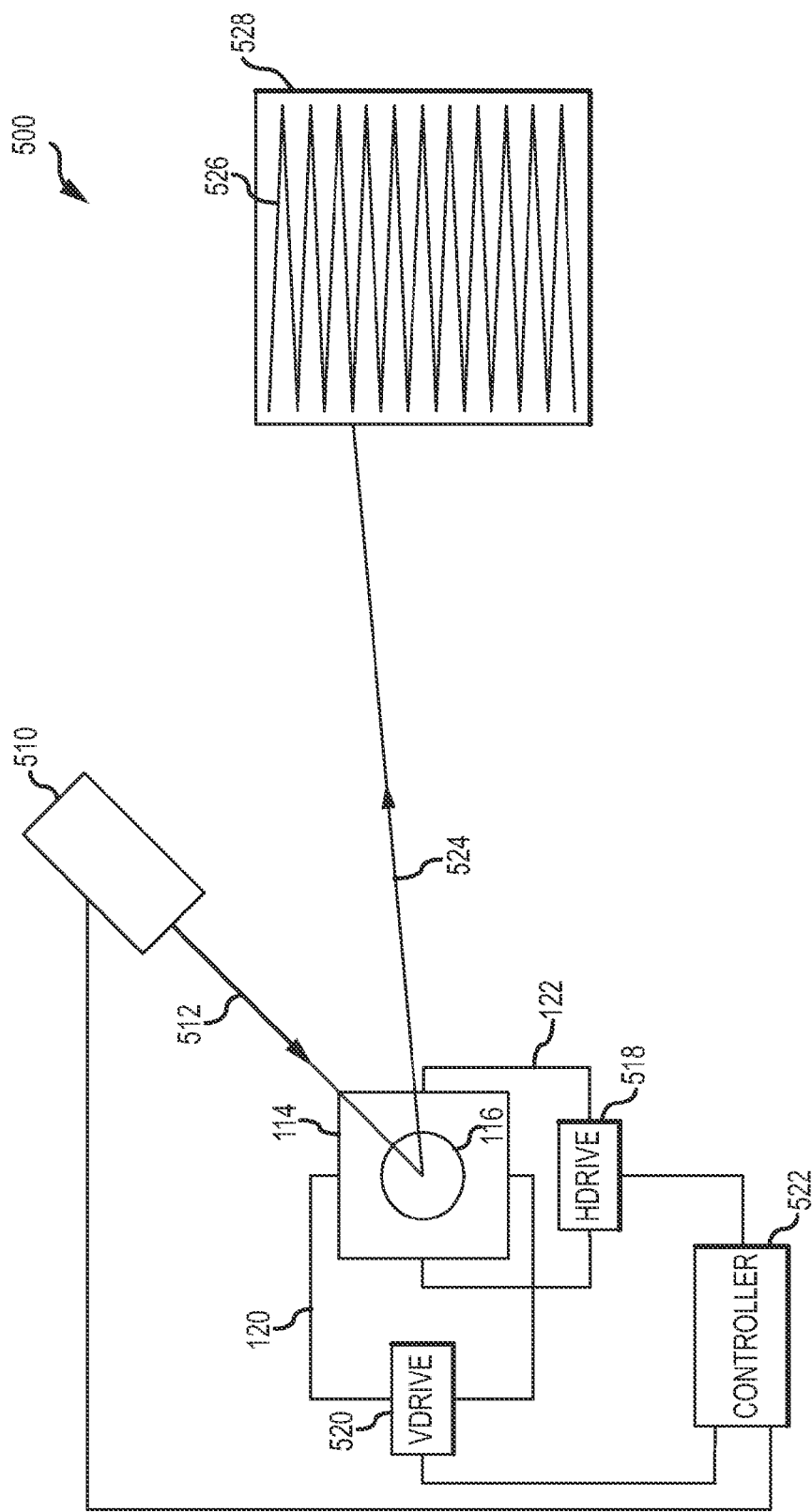
FIG. 5 is a diagram of a scanned beam display having a tuned support structures for an electric comb drive scanner in accordance with one or more embodiments.

Referring now to FIG. 5, a diagram of a scanned beam display having tuned support structures for an electric comb drive scanner in accordance with one or more embodiments will be discussed. Although FIG. 5 illustrates one type of a scanned beam display system for purposes of discussion, for example a biaxial comb drive mircroelectromechanical system (MEMS) based display, it should be noted that other types of scanning displays including those that use two uniaxial scanners as well as systems that use the combination of a one-dimensional spatial light modulator with a single axis scanner as some of many examples, may also utilize the claimed subject matter and the scope of the claimed subject matter is not limited in these respects. Scanned beam display 500 may be adapted to include a comb drive scanner 100 with reduced warping of the comb support structures as discussed herein. Details of operation of scanned beam display are discussed, below.

As shown in FIG. 5, scanned beam display 500 comprises a light source 510, which may be a laser light source such as a laser or the like, capable of emitting a beam 512 which may comprise a laser beam. In some embodiments, light source 510 may comprise two or more light sources, such as in a color system having red, green, and blue light sources, wherein the beams 512 from the light sources 510 may be combined into a single beam. In one or more embodiments, light source 510 may include a first full color light source such as a red, green, and blue light source, and in addition may include a fourth light source to emit an invisible beam such as an ultraviolet beam or an infrared beam. The beam 512 is incident on a scanning platform 114 which may comprise a microelectromechanical system (MEMS) based comb drive scanner 100 or the like in one or more embodiments, and reflects off of scanning mirror 116 to generate a controlled output beam 524. A horizontal drive circuit 518 and/or a vertical drive circuit 520, together comprising drive circuit 118 of FIG. 1, modulate the direction in which scanning mirror 116 is deflected to cause output beam 524 to generate a raster scan 526, thereby creating a displayed image, for example projected onto a display surface and/or image plane 528. A display controller 522 controls horizontal drive circuit 518 and vertical drive circuit 520 by converting pixel information of the displayed image into laser modulation synchronous to the scanning platform 114 to write the image information as a displayed image based upon the position of the output beam 524 in raster pattern 526 and the corresponding intensity and/or color information at the corresponding pixel in the image. Display controller 522 may also control other various functions of scanned beam display 500.

In one or more embodiments, for two dimensional scanning to generate a two dimensional image ultimately with a three-dimensional effect, a horizontal axis may refer to the horizontal direction of raster scan 526 and the vertical axis may refer to the vertical direction of raster scan 156. Scanning mirror 116 may sweep the output beam 124 horizontally at a relatively higher frequency and also vertically at a relatively lower frequency. The result is a scanned trajectory of laser beam 524 to result in raster scan 126. The fast and slow axes may also be interchanged such that the fast scan is in the vertical direction and the slow scan is in the horizontal direction. However, the scope of the claimed subject matter is not limited in these respects.

In one or more particular embodiments, the scanned beam display 500 as shown in and described with respect to FIG. 5 may comprise a pico-projector developed by Microvision Inc., of Redmond, Wash., USA, referred to as PicoP™. In such embodiments, light source 510 of such a pico-projector may comprise one red, one green, and one blue laser with a lens near the output of the respective lasers that collects the light from the laser and provides a very low numerical aperture (NA) beam at the output. The light from the lasers may then be combined with dichroic elements into a single white beam 512. Using a beam splitter and/or basic fold-mirror optics, the combined beam 512 may be relayed onto biaxial MEMS scanning mirror 116 disposed of scanning platform 114 that scans the output beam 524 in a raster pattern 526. Modulating the lasers synchronously with the position of the scanned output beam 524 may create the projected image on display surface 528. In one or more embodiments the scanned beam display 500, or engine, may be disposed in a single module known as an Integrated Photonics Module (IPM), which in some embodiments may be 7 millimeters (mm) in height and less than 5 cubic centimeters (cc) in total volume, although the scope of the claimed subject matter is not limited in these respects. An example of an information handling system incorporating such an integrated photonics module as a projector is shown in and described with respect to FIG. 6, below.

Figure 6:
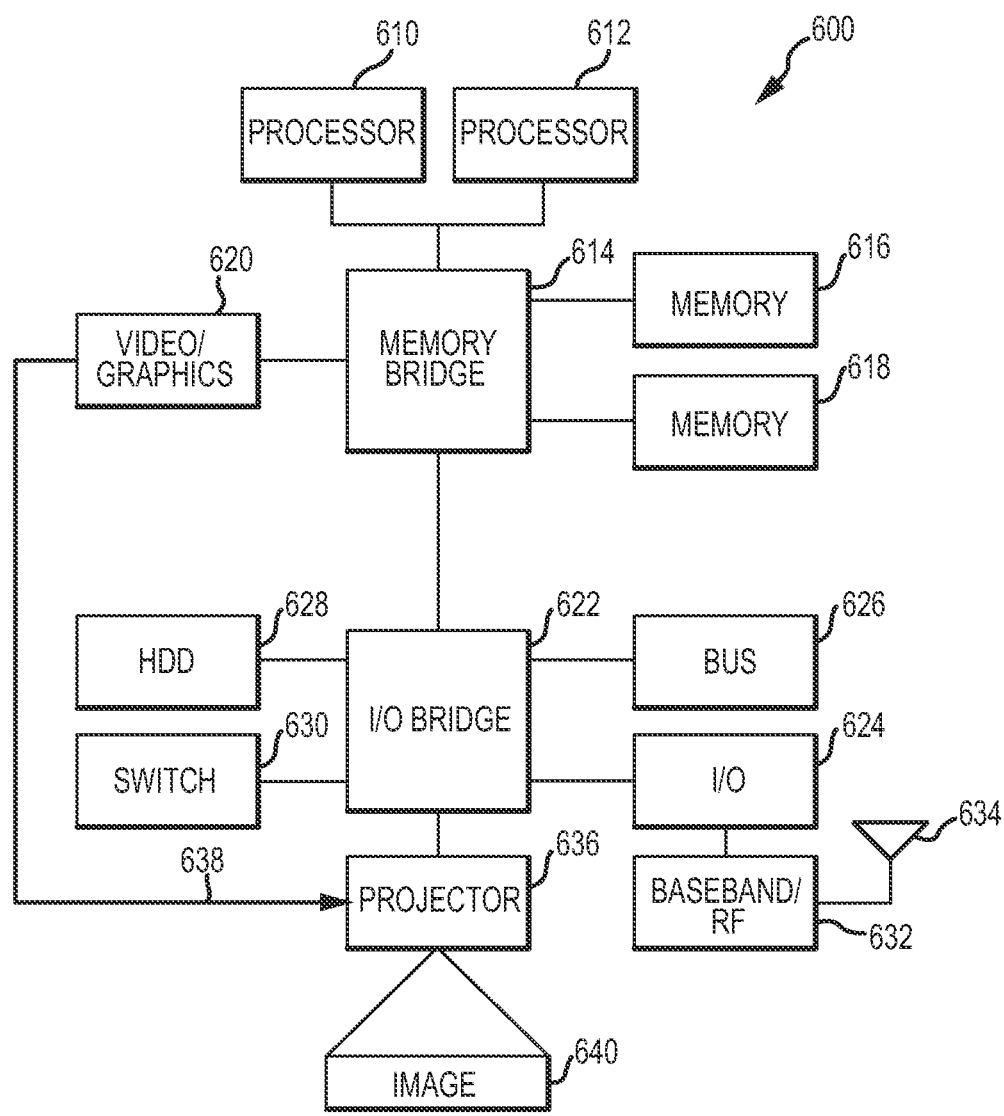
FIG. 6 is a block diagram of an information handling system incorporating an electric comb drive scanner having tuned support structures in accordance with one or more embodiments.

Referring now to FIG. 6, a block diagram of an information handling system incorporating an electric comb drive scanner having tuned support structures in accordance with one or more embodiments will be discussed. Information handling system 600 of FIG. 6 may tangibly embody comb drive scanner 100 as shown in and described with respect to FIG. 1 as part of projector 636. Alternatively, projector 636 may comprise other types of comb drive scanning devices such as a camera or a bar code reader, and the scope of the claimed subject matter is not limited in this respect. Although information handling system 600 represents one example of several types of computing platforms, including cell phones, personal digital assistants (PDAs), netbooks, notebooks, internet browsing devices, tablets, and so on, information handling system 600 may include more or fewer elements and/or different arrangements of the elements than shown in FIG. 6, and the scope of the claimed subject matter is not limited in these respects.

Information handling system 600 may comprise one or more processors such as processor 610 and/or processor 612, which may comprise one or more processing cores. One or more of processor 610 and/or processor 612 may couple to one or more memories 616 and/or 618 via memory bridge 614, which may be disposed external to processors 610 and/or 612, or alternatively at least partially disposed within one or more of processors 610 and/or 612. Memory 616 and/or memory 618 may comprise various types of semiconductor based memory, for example volatile type memory and/or non-volatile type memory. Memory bridge 614 may couple to a video/graphics system 620 to drive a display device, which may comprise projector 636, coupled to information handling system 600. Projector 636 may comprise comb drive scanner 100 of FIG. 1 and/or complete scanned beam display 500 of FIG. 5. In one or more embodiments, video/graphics system 620 may couple to one or more of processors 610 and/or 612 and may be disposed on the same core as the processor 610 and/or 612, although the scope of the claimed subject matter is not limited in this respect.

Information handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information handling system 600. Bus system 626 may comprise one or more bus systems such as a peripheral component interconnect (PCI) express type bus or the like, to connect one or more peripheral devices to information handling system 600. A hard disk drive (HDD) controller system 628 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 630 may be utilized to couple one or more switched devices to I/O bridge 622, for example Gigabit Ethernet type devices or the like. Furthermore, as shown in FIG. 6, information handling system 600 may include a baseband and radio-frequency (RF) block 632 comprising a base band processor and/or RF circuits and devices for wireless communication with other wireless communication devices and/or via wireless networks via antenna 634, although the scope of the claimed subject matter is not limited in these respects.

In one or more embodiments, information handling system 600 may include a projector 636 that may correspond to comb drive scanner 100 of FIG. 1 and/or scanned beam display 500 of FIG. 5, and which may include any one or more or all of the components thereof. In one or more embodiments, projector 636 may be controlled by one or more of processors 610 and/or 612 to implements some or all of the functions of controller 522 of FIG. 15. In one or more embodiments, projector 636 may comprise a MEMS based comb drive scanner 100 of a scanned beam display 500 for displaying an image 640 projected by projector 636. In one or more embodiments, such a display may include video/graphics block 620 having a video controller to provide video information 638 to projector 636 to display an image 640. In one or more embodiments, comb drive scanner 100 may have tuned support structures to provide a more uniform warping of the support structures on which the combs are disposed. However, these are merely example implementations for projector 636 within information handling system 600, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to a tuned support structures for an electrostatic comb drive scanner and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
   a scanning body comprising a mirror supported by one or more flexures along a first axis;
   one or more support structures coupled to the one or more flexures; and
   one or more drive combs disposed on the one or more support structures, the one or more drive combs being oriented parallel to the first axis and facing away from the mirror, the one or more drive combs being centered on a centerline of the mirror orthogonal to the first axis, wherein the drive combs cause the mirror to rotate about the first axis in response to a drive signal applied to the drive combs;
   wherein the one or more drive combs are supported by the one or more support structures at centers of the drive combs and not at ends of the drive combs, and wherein the one or more support structures are tuned to reduce non-uniformity of warping of the support structures to reduce variation in disengagement of the drive combs along a length of the drive combs.

2. An apparatus as claimed in claim 1, wherein the support structures comprise an S-shaped structure, a curved shaped structure, an L-shaped structure, an angle shaped structure, or a linear shaped structure, or combinations thereof.

3. An apparatus as claimed in claim 1, wherein the one or more support structures are tuned via dynamic analysis, simulation, or trial and error, or combinations thereof.

4. An apparatus, comprising:
a scanning body comprising a mirror supported by a first set of one or more flexures along a first axis, wherein the first set of one or more flexures are coupled to the scanning body and the scanning body is supported by a second set of one or more flexures coupled to a frame along a second axis;
a first set of one or more support structures coupled the first set of one or more flexures and a second set of one or more support structures coupled to the second set of one or more flexures; and
a first set of one or more drive combs disposed on the first set of one or more support structures, the first set of one or more drive combs being oriented parallel to the first axis and facing away from the mirror, the first set of one or more drive combs being centered on a centerline of the mirror orthogonal to the first axis, and a second set of one or more drive combs disposed on the second set of one or more support structures, wherein the drive combs cause the mirror to rotate about the first axis and about the second axis in response to a drive signal applied to the drive combs;
wherein the first set of one or more drive combs are supported by the first set of one or more support structures at centers of the first set of one or more drive combs and not at ends of the first set of one or more drive combs, and wherein the first set or the second set, or combinations thereof, of support structures are tuned to reduce non-uniformity of warping of the support structures to reduce variation in disengagement of the drive combs along a length of the drive combs.

5. An apparatus as claimed in claim 4, wherein the support structures comprise an S-shaped structure, a curved shaped structure, an L-shaped structure, an angle shaped structure, or a linear shaped structure, or combinations thereof.

6. An apparatus as claimed in claim 4, wherein the one or more support structures are tuned via dynamic analysis, simulation, or trial and error, or combinations thereof.

7. An information handling system, comprising:
a processor and a memory coupled to the processor; and
a scanned beam display coupled to the processor to display an image stored in the memory, the scanned beam display comprising an electric comb drive scanner, the electric comb drive scanner comprising:
a scanning body comprising a mirror supported by one or more flexures along a first axis;
one or more support structures coupled to the one or more flexures; and
one or more drive combs disposed on the one or more support structures, the one or more drive combs being oriented parallel to the first axis and facing away from the mirror, the one or more drive combs being centered on a centerline of the mirror orthogonal to the first axis, wherein the drive combs cause the mirror to rotate about the first axis in response to a drive signal applied to the drive combs;
wherein the one or more drive combs are supported by the one or more support structures at centers of the drive combs and not at ends of the drive combs, and wherein the one or more support structures are tuned to reduce non-uniformity of warping of the support structures to reduce variation in disengagement of the drive combs along a length of the drive combs.

8. An information handling system as claimed in claim 7, wherein the support structures comprise an S-shaped structure, a curved shaped structure, an L-shaped structure, an angle shaped structure, or a linear shaped structure, or combinations thereof.

9. An information handling system as claimed in claim 7, wherein the one or more support structures are tuned via dynamic analysis, simulation, or trial and error, or combinations thereof.

* * * * *